US012513469B2

(12) United States Patent
Querry et al.

(10) Patent No.: US 12,513,469 B2
(45) Date of Patent: Dec. 30, 2025

(54) DUAL AXIAL MAGNETIC FLUX INDUCTION SPEAKER

(71) Applicant: Michel Oltramare, Crans-près-Céligny (CH)

(72) Inventors: Hector Querry, La Neuveville (CH); Guillaume Heisel, Bienne (CH); Adrien Hoffet, Prilly (CH); Jean-Luc Thuliez, Le Landeron (CH); Etienne Crozier, La Neuveville (CH); Robin Zimmermann, La Neuveville (CH)

(73) Assignee: Michel Oltramare, Crans-Pre-Celigny (CH)

( * ) Notice: Subject to any disclaimer, the term of this patent is extended or adjusted under 35 U.S.C. 154(b) by 163 days.

(21) Appl. No.: 17/918,078

(22) PCT Filed: Apr. 1, 2021

(86) PCT No.: PCT/IB2021/052737
§ 371 (c)(1),
(2) Date: Oct. 10, 2022

(87) PCT Pub. No.: WO2021/205295
PCT Pub. Date: Oct. 14, 2021

(65) Prior Publication Data

US 2023/0164492 A1 May 25, 2023

(30) Foreign Application Priority Data

Apr. 8, 2020 (CH) .................................... 00425/20

(51) Int. Cl.

| | |
|---|---|
| ***H04R 9/06*** | (2006.01) |
| ***H02K 33/16*** | (2006.01) |
| ***H04R 9/02*** | (2006.01) |

(52) U.S. Cl.
CPC ............... *H04R 9/06* (2013.01); *H02K 33/16* (2013.01); *H04R 9/025* (2013.01); *H04R 2209/043* (2013.01)

(58) Field of Classification Search
CPC .......... H04R 9/04; H04R 9/063; H04R 9/025; H04R 2400/00; H04R 2209/022;
(Continued)

(56) References Cited

U.S. PATENT DOCUMENTS

| | | | |
|---|---|---|---|
| 2,621,261 | A | 12/1952 | Karlsson et al. |
| 4,965,839 | A | 10/1990 | Elieli |

(Continued)

FOREIGN PATENT DOCUMENTS

| | | |
|---|---|---|
| CN | 204578772 | 8/2015 |
| CN | 109195077 A | 1/2019 |

(Continued)

OTHER PUBLICATIONS

International Search Report for PCT/IB2021/052737 dated Jul. 15, 2021, 5 pages.

(Continued)

*Primary Examiner* — Carolyn R Edwards
*Assistant Examiner* — Julie X Dang
(74) *Attorney, Agent, or Firm* — NIXON & VANDERHYE

(57) ABSTRACT

The present invention relates to the operating principle of a loudspeaker (20) with an induction motor (10). The motor (10) has two magnets (1*a* and 1*b*) positioned on either side of a central core (2). The magnets (1*a* and 1*b*) thus create two magnetic fields (9*a* and 9*b*) doubling the magnetic field detected in the movable armature (4). The magnetic field coupled to the electrical field generated by a fixed coil (5) creates a force in the armature (4), which is linked to diaphragm (7) producing the sound. Thus, by increasing the
(Continued)

magnetic field, and therefore the force generated in the armature (4), the performances of the loudspeaker (20) are likewise enhanced.

7 Claims, 11 Drawing Sheets

(58) Field of Classification Search
CPC ...... H04R 7/18; H04R 2307/207; H04R 7/14; H04R 9/06; H04R 9/046; H04R 9/043; H04R 7/122; H04R 2400/11; H04R 7/127; H04R 7/20; H04R 7/04; H04R 1/2803; H04R 7/045; H04R 2499/15; H04R 2499/11; H04R 2400/03; G06F 1/1637; G06F 3/016; G06F 1/1626; G06F 1/1684; G06F 1/1688
USPC ....... 381/400, 401, 402, 412, 421, 414, 397, 381/420, 419, 410, 405, 407, 406, 423, 381/409
See application file for complete search history.

(56) References Cited

U.S. PATENT DOCUMENTS

| | | | | |
|---|---|---|---|---|
| 5,062,140 | A | 10/1991 | Inanaga et al. | |
| 5,742,696 | A | 4/1998 | Walton | |
| 6,359,996 | B1 | 3/2002 | Ohashi | |
| 6,373,957 | B1 * | 4/2002 | Stewart | H04R 9/022 381/397 |
| 6,542,617 | B1 * | 4/2003 | Fujihira | H04R 9/04 381/407 |
| 7,084,548 | B1 * | 8/2006 | Gabrys | H02K 3/47 310/156.08 |
| 8,009,857 | B2 | 8/2011 | Bohlender et al. | |
| 2004/0218778 | A1 * | 11/2004 | Weisman | H04R 9/043 381/396 |
| 2005/0041831 | A1 * | 2/2005 | Stiles | H04R 9/022 381/412 |
| 2005/0190946 | A1 * | 9/2005 | Stiles | H04R 9/025 381/421 |
| 2006/0165251 | A1 * | 7/2006 | Bank | H04R 9/025 381/412 |
| 2006/0239499 | A1 * | 10/2006 | Stiles | H04R 9/025 381/421 |
| 2008/0199039 | A1 * | 8/2008 | Bohlender | H04R 9/06 381/412 |
| 2010/0054501 | A1 | 3/2010 | Choi | |
| 2012/0051188 | A1 * | 3/2012 | Graber | G10K 11/006 367/175 |
| 2013/0192581 | A1 * | 8/2013 | Haefner | F04D 25/026 126/77 |
| 2015/0117698 | A1 * | 4/2015 | Bullimore | H04R 7/16 381/398 |
| 2015/0271605 | A1 | 9/2015 | Zhang | |
| 2016/0165335 | A1 * | 6/2016 | Goossens | H04R 3/08 381/351 |
| 2018/0206040 | A1 | 7/2018 | Hyde | |
| 2019/0098416 | A1 * | 3/2019 | French | H04R 9/06 |
| 2021/0048320 | A1 * | 2/2021 | Marauska | G01D 5/16 |

FOREIGN PATENT DOCUMENTS

| | | | |
|---|---|---|---|
| GB | 1348535 | A | 3/1974 |
| IN | 105491491 | A | 4/2016 |
| JP | S55-86288 | A | 6/1980 |
| JP | S56-161798 | A | 12/1981 |
| JP | S59-216394 | A | 12/1984 |
| JP | H03-239099 | A | 10/1991 |
| JP | H11-55789 | | 2/1999 |
| JP | H1155787 | A | 2/1999 |
| JP | 2000-350829 | | 12/2000 |
| KR | 2014-0091365 | A | 7/2014 |
| KR | 2018-0085393 | A | 7/2018 |
| WO | 2013/013502 | A1 | 1/2013 |
| WO | 2017/028034 | A1 | 2/2017 |
| WO | 2020/161669 | A1 | 8/2020 |

OTHER PUBLICATIONS

Written Opinion of the ISA for PCT/IB2021/052737 dated Jul. 15, 2021, 5 pages.
Office Action, issued in European Patent Application No. 21724030.8 dated Feb. 5, 2025.

* cited by examiner

DUAL AXIAL MAGNETIC FLUX INDUCTION SPEAKER

CORRESPONDING APPLICATION

This application is the U.S. national phase of International Application No. PCT/IB2021/052737 filed Apr. 1, 2021 which designated the U.S. and claims priority to CH Patent Application No. 00425/20 filed Apr. 8, 2020, the entire contents of each of which are hereby incorporated by reference.

TECHNICAL FIELD

The present invention relates to induction motor devices comprising at least one fixed coil, one mobile armature and magnets. Such a device may for example form an induction loudspeaker.

More precisely, the present invention relates to the means for driving the movement of the diaphragm of an induction loudspeaker.

PRIOR ART

The diaphragms of loudspeakers working in the low and medium frequencies are generally caused to move by an actuator or motor. There are mainly two types of actuators for loudspeakers: the actuators the most often used, with a mobile coil connected to the diaphragm, referred to as "voicecoil", and induction actuators, with fixed coil and magnets, and a mobile armature fixed to the diaphragm.

Numerous patents relate to the composition of induction motors with a fixed coil: U.S. Pat. No. 2,621,261A, 4,965,839A, 5,062,140A, 5,742,696A, 6,359,996B1, 6,542,617B1 and also 8,009,857B2. These patents all mention radial magnetic flux actuators, with magnets placed all around a central core.

Other patents mention audio systems comprising two magnets and creating an axial magnetic flux: CN105491491A, CN109195077A, KR20140091365A, KR20180085393A, US2010054501A1, US2015271605A1, US2018206040A1, WO2013013502A1, WO2017028034A1. However, none of these inventions has adapted this system of axial magnetic flux to an induction system.

On conventional induction loudspeakers, as described in the patent U.S. Pat. No. 8,009,857B2, the magnets are placed radially inside or outside of a magnetic air space where the armature is moving. Thus configured, the magnets create a single magnetic field present over the whole circumference of the actuator. Since the magnetic field is generated by the magnets, a good quality of magnet is preferable. However, the higher the strength of the magnet, the lower is its Curie temperature, in other words the temperature at which it is demagnetized. However, the temperature in the core of a loudspeaker tends to rise rapidly. Although some patents provide solutions for cooling loudspeakers: GB1348535A, JPH03239099A, JPS5586288A, JPS56161798A, JPS59216394A or else the application PCT/IB2020/050963 filed on the 6 Feb. 2020 in the name of M. Michel OLTRAMARE, it is necessary to reach a compromise on the power of the magnet depending on the maximum temperature of its environment.

The magnetic field coupled to a variable electric field (supplied by the coil) creates a force in the armature, thus causing it to move, just like the diaphragm. The greater this force, the faster the armature moves, thus increasing the sensitivity of the loudspeaker.

Since the force for movement of the armature, and hence the sensitivity of the loudspeaker, is linked to the magnetic field, itself linked to the composition of the magnet, the physical limit is quickly reached.

DESCRIPTION OF THE INVENTION

The aim of the present invention is to improve the known systems, notably but not exclusively, loudspeakers.

The present invention allows the aforementioned drawbacks linked to the magnetic field to be overcome and provides a dual axial magnetic flux induction system.

For this purpose, the device such as a loudspeaker, such as defined in the introduction, is notably characterized in that it comprises a motor comprising two sources of magnetic fields, placed axially on either side of a central core. These magnetic field sources may be permanent ring magnets, or other shapes of bipolar permanent magnets such as disks or ring sections. Their poles are axially aligned with the core, but their polarities are opposing. The magnetic fields generated by these magnets are guided by the central core on the one hand and, on the other hand, by one or more members having a good magnetic conductivity and which close the magnetic circuit. Between the assembly comprising the core and the two magnets, and all of the members closing the magnetic field, is located an armature, attached to the diaphragm of the loudspeaker, and a fixed coil, supplied with AC current at a variable frequency creating a variable magnetic field. This magnetic field creates Foucault currents in the armature. These Foucault currents associated with the magnetic field generated by the magnets apply a force on the armature which is then moved with the diaphragm, which produces a sound wave.

By being so positioned, each magnet will create its own magnetic field. In this way, the total magnetic field generated in the loudspeaker is doubled in the armature compared with a conventional induction loudspeaker. This double magnetic field increases the force generated on the armature, and thus improves the sensitivity of the loudspeaker.

By doubling the magnets, the intensity of the magnetic field is increased without modifying the composition of the magnet, and without having to increase the current in the coil. If the current in the coil remains the same, the temperature within the motor does not change. If the composition of the magnet remains the same, the Curie temperature does not change, and the maximum temperature allowed inside of the loudspeaker also remains identical.

A compromise between the operating temperature of the loudspeaker and the quality of the magnets is thus avoided.

In embodiments, the present invention relates to an induction motor device comprising a fixed coil, a mobile armature within a magnetic air space, a central core, and it comprises at least two magnetic sources disposed axially on either side of the core central.

In embodiments, the magnetic sources are opposing, thus creating two distinct magnetic fields.

In embodiments, at least one of the magnetic sources comprises one or more bipolar permanent ring magnets.

In embodiments, at least one of the magnetic sources comprises one or more disk-shaped bipolar permanent magnets.

In embodiments, at least one of the magnetic sources comprises one or more bipolar permanent magnets in the form of ring sections.

In embodiments, the loudspeaker comprises at least one device such as described in the present application.

In embodiments, the loudspeaker comprises at least one diaphragm linked to the armature and caused to move by the armature.

In embodiments, the loudspeaker comprises a salad bowl to which the diaphragm is fixed and a housing fixing the induction motor device to the salad bowl.

In embodiments, the invention relates to a method for moving an object by means of an induction motor device such as described in the present application.

In embodiments, the object moved by the induction motor device is a diaphragm, for example the diaphragm of a loudspeaker.

BRIEF DESCRIPTION OF THE DRAWINGS

The present invention and its advantages will become apparent in the description hereinbelow, with reference to the appended drawings, in which.

DETAILED DESCRIPTION OF NON-LIMITING EMBODIMENTS OF THE INVENTION

With reference to the figures, the induction motor 10 of the loudspeaker 20 comprises a core 2, a bowl 3*b* and a base plate 3*a*, all three formed from a magnetically conducting material, preferably steel or another equivalent material; a fixed coil 5 installed inside of said bowl 3*b* and supplied with an AC current; two permanent magnets 1*a*, 1*b*, made of a highly magnetic material, preferably neodymium, an upper magnet 1*a* having a north face 11*a* and a south face 11*b*, and a lower magnet 1*b* having a north face 12*a* and a south face 12*b*.

Figure 6A:
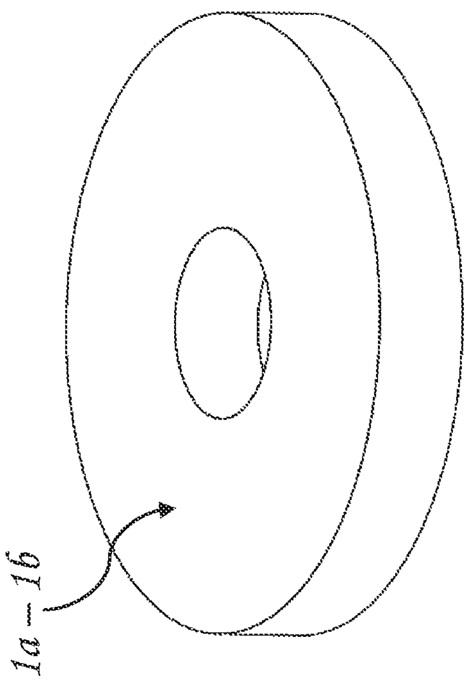
FIG. 6*a* shows a ring-shaped magnet according to one embodiment of the invention.
Figure 6B:
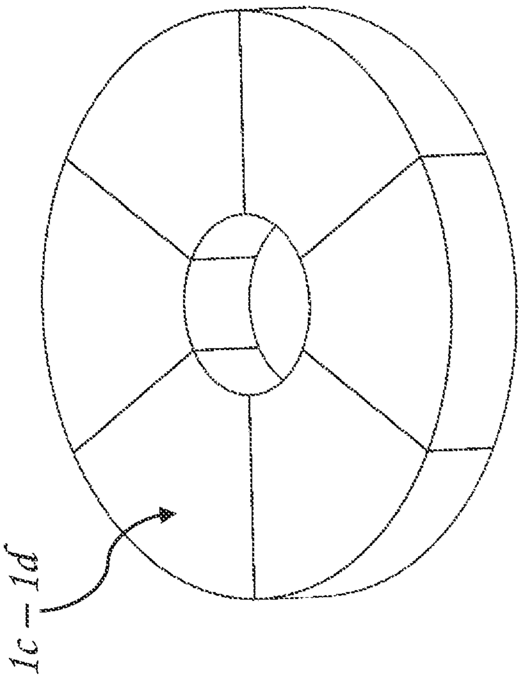
FIG. 6*b* shows a magnet in the form of ring sections according to one embodiment of the invention.
Figure 6C:
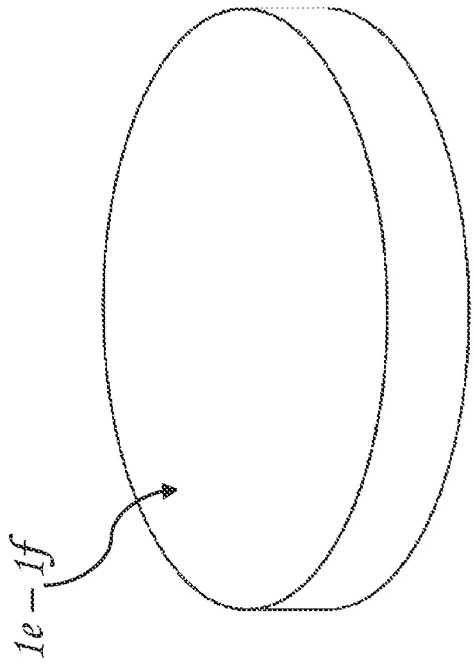
FIG. 6*c* shows a disk-shaped magnet according to one embodiment of the invention.
Figure 7A:
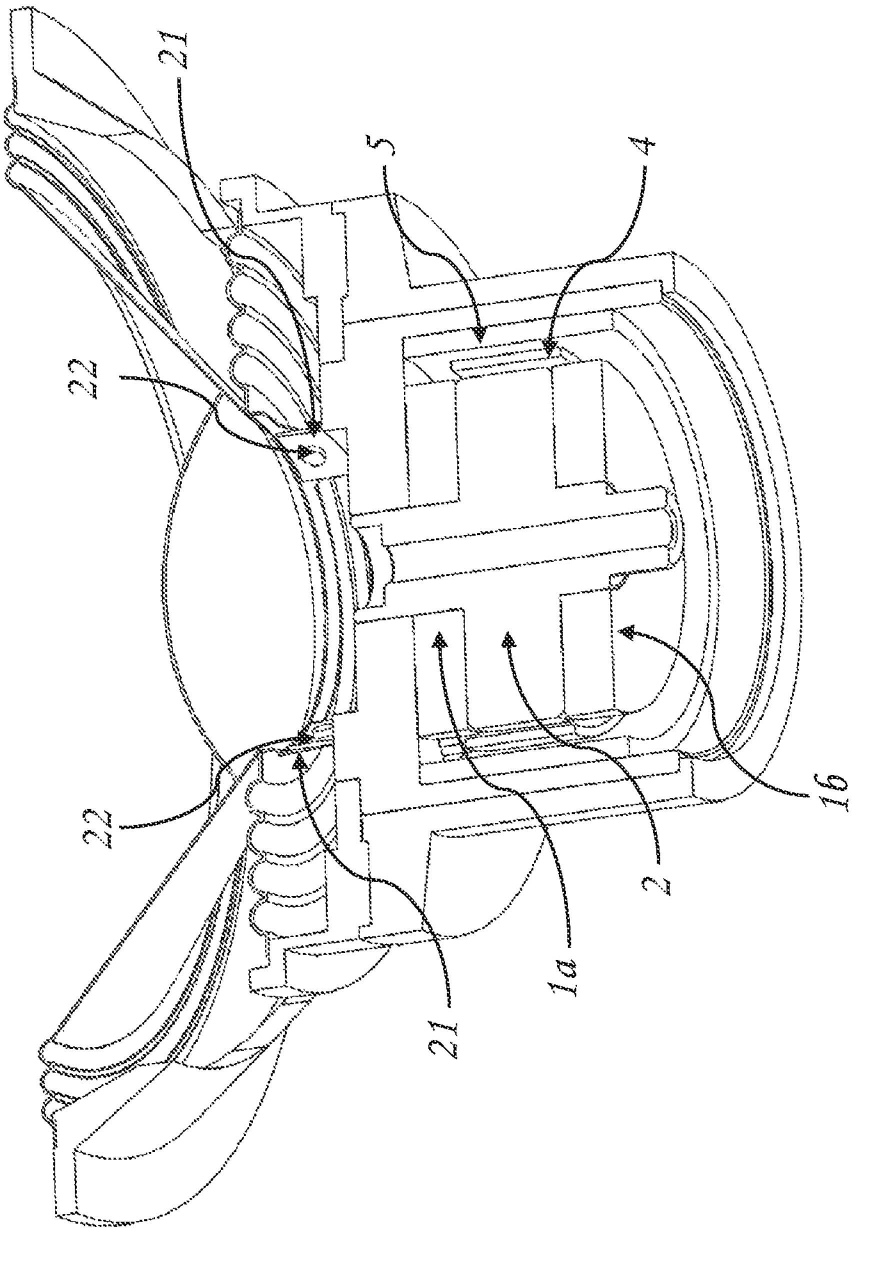
FIG. 7*a* shows a cross-sectional perspective view of the loudspeaker comprising the induction motor composed of ring magnets according to one embodiment of the invention.
Figure 7B:
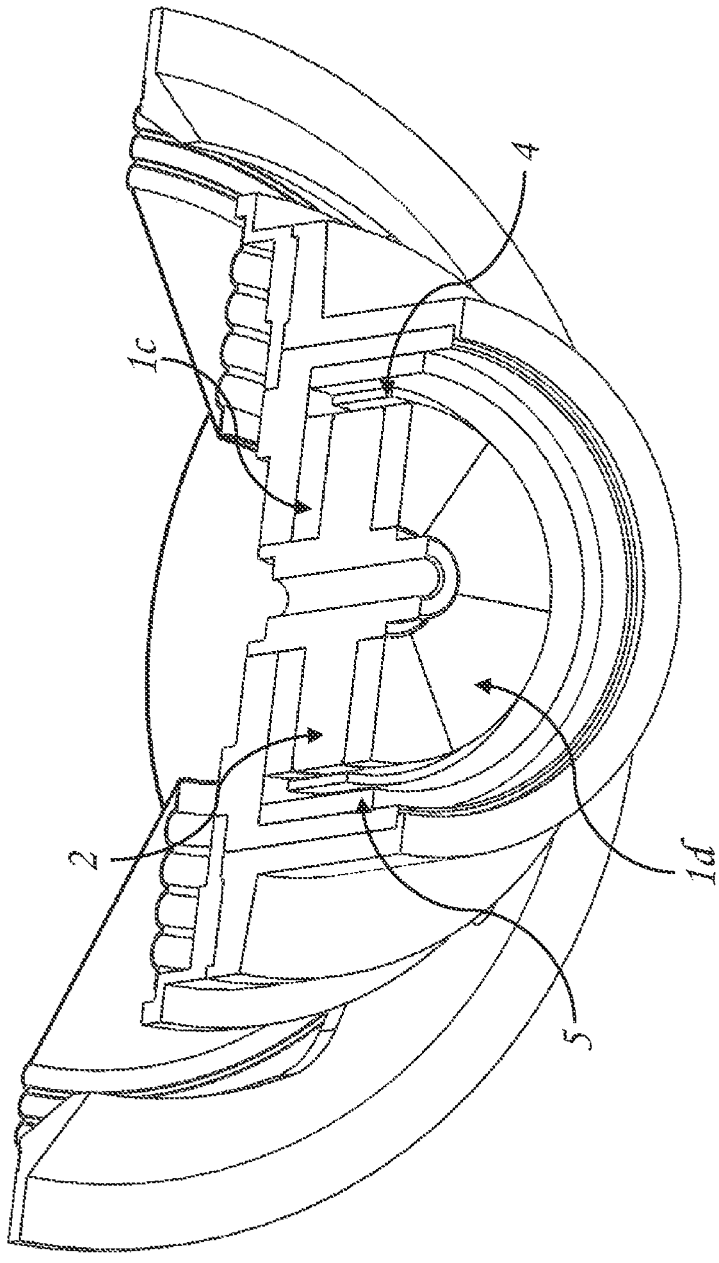
FIG. 7*b* shows a cross-sectional perspective view of the loudspeaker comprising the induction motor composed of magnets in the form of ring sections according to one embodiment of the invention.
Figure 7C:
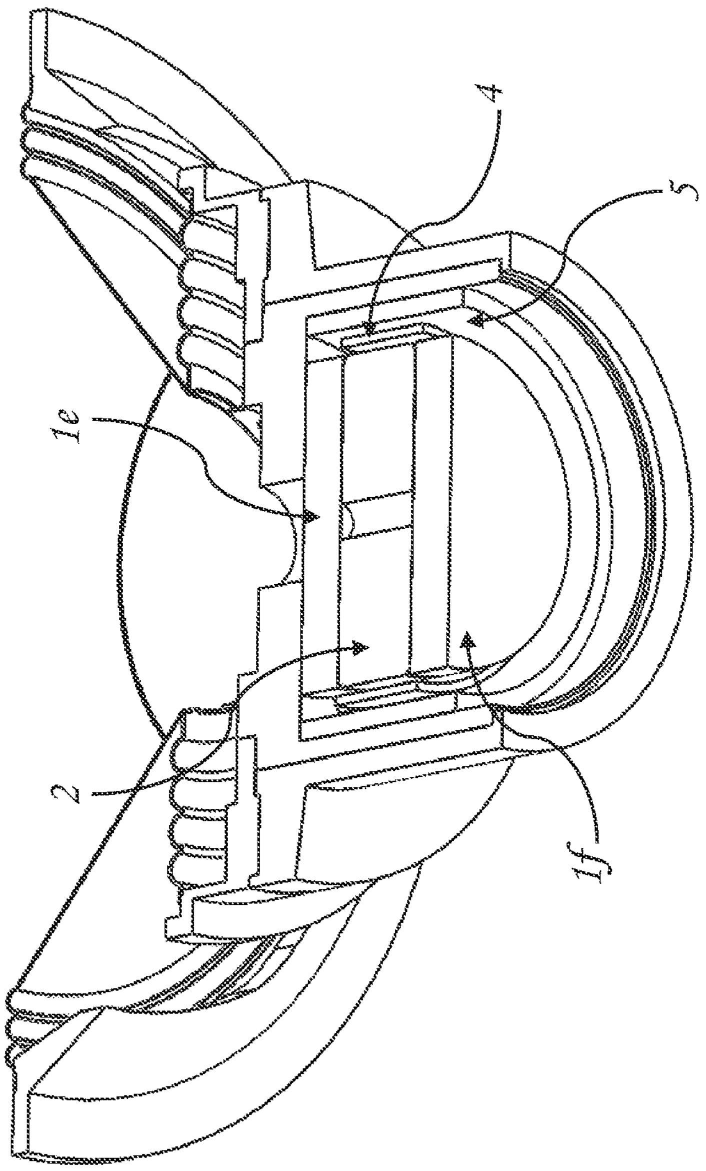
FIG. 7*c* shows a cross-sectional and perspective view of the loudspeaker comprising the induction motor composed of disk-shaped magnets according to one embodiment of the invention.

Said induction motor 10 may be equipped with various shapes of magnets, such as ring magnets 1*a* and 1*b* shown in FIGS. 6*a* and 7*a*, magnets taking the form of ring sections such as the upper magnets in the form of ring sections 1*c* and the lower magnets in the form of ring sections 1*d* shown in FIGS. 6*b* and 7*b*, or else magnets in the form of disks such as the upper magnet in the form of a disk 1*e* and the lower magnet in the form of a disk 1*f* shown in FIGS. 6*c* and 7*c*. These examples are non-limiting but illustrative and other equivalent shapes are possible.

Said magnets are installed so as to have their said north faces, respectively 11*a* and 12*a*, in contact with said core 2, said south face of the upper magnet 11*b* in contact with said bowl 3*b* and said south face of the lower magnet 12*b* in contact with said base plate 3*a*, in such a manner as to form between said core 2, said upper magnet 1*a*, said lower magnet 1*b*, said bowl 3*b*, said base plate 3*a* and said fixed coil 5, a magnetic air space 6. Within said magnetic air space 6 an armature 4 is installed composed of a conductive material, preferably aluminum, and connected to a loudspeaker diaphragm 7. The attachment system for connecting the diaphragm 7 to the armature 4 may for example comprise tabs 21 of the armature 4 which are fixed to studs 22 of the diaphragm. Other equivalent means of attachment are possible, for example the bonding of the armature 4 to the diaphragm 7, an additional coupling element, clip-mounting, etc.

Figure 1:
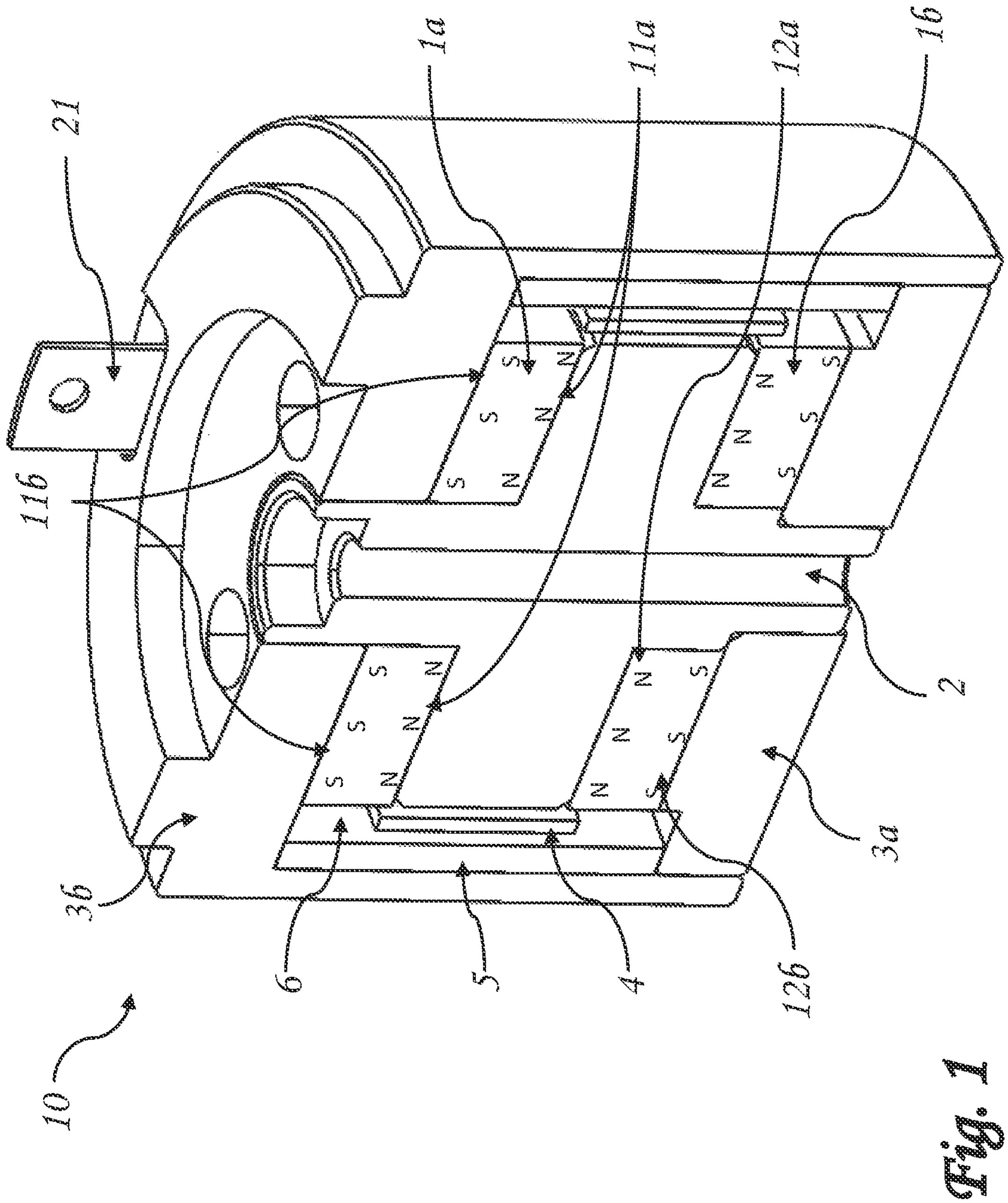
FIG. 1 shows a cross-sectional perspective view of the motor of the loudspeaker comprising the dual axial magnetic flux induction system according to one embodiment of the invention.
Figure 2:
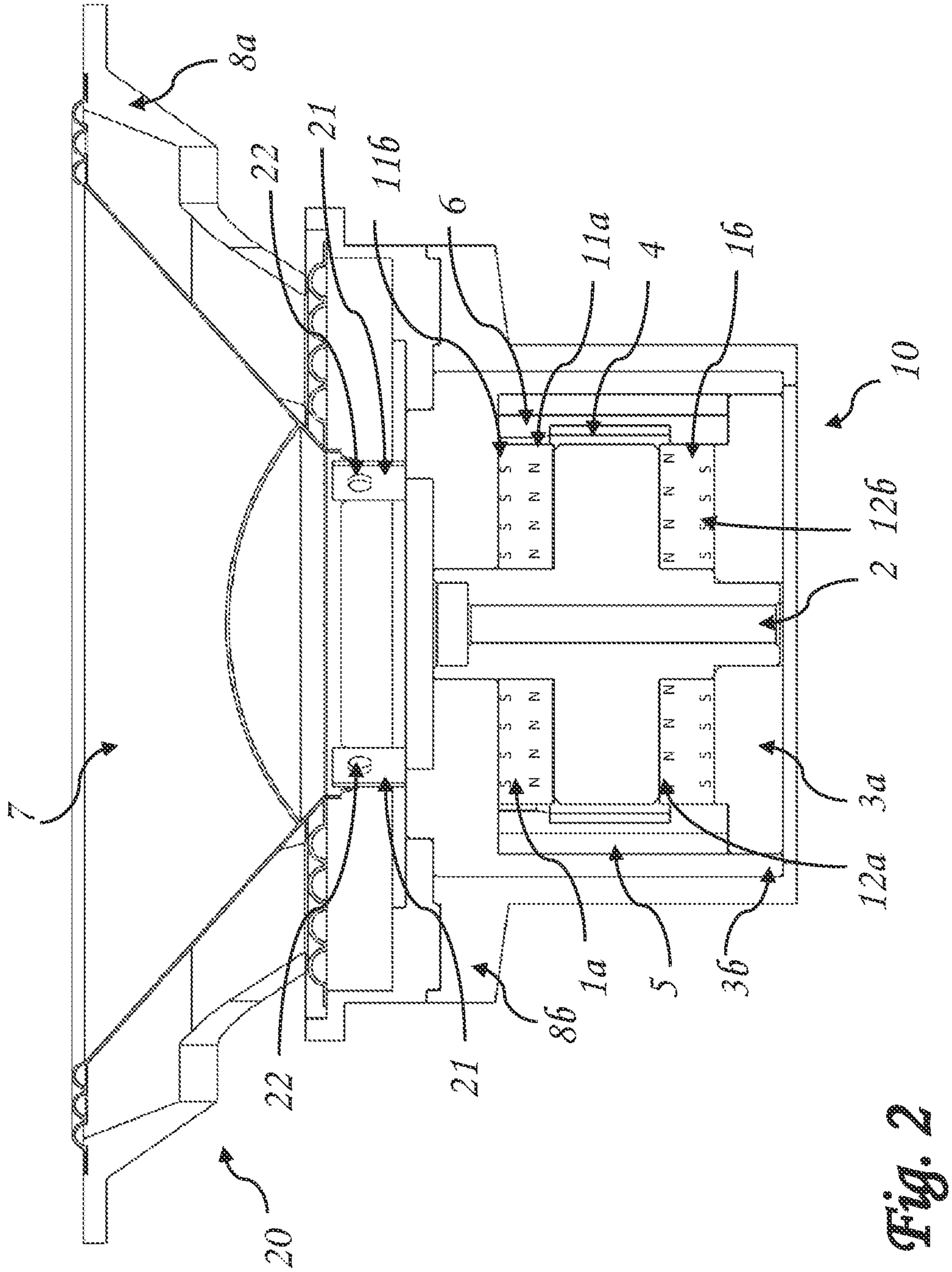
FIG. 2 shows a cross-sectional view of the loudspeaker comprising the motor with the dual axial magnetic induction system according to one embodiment of the invention.
Figure 3:
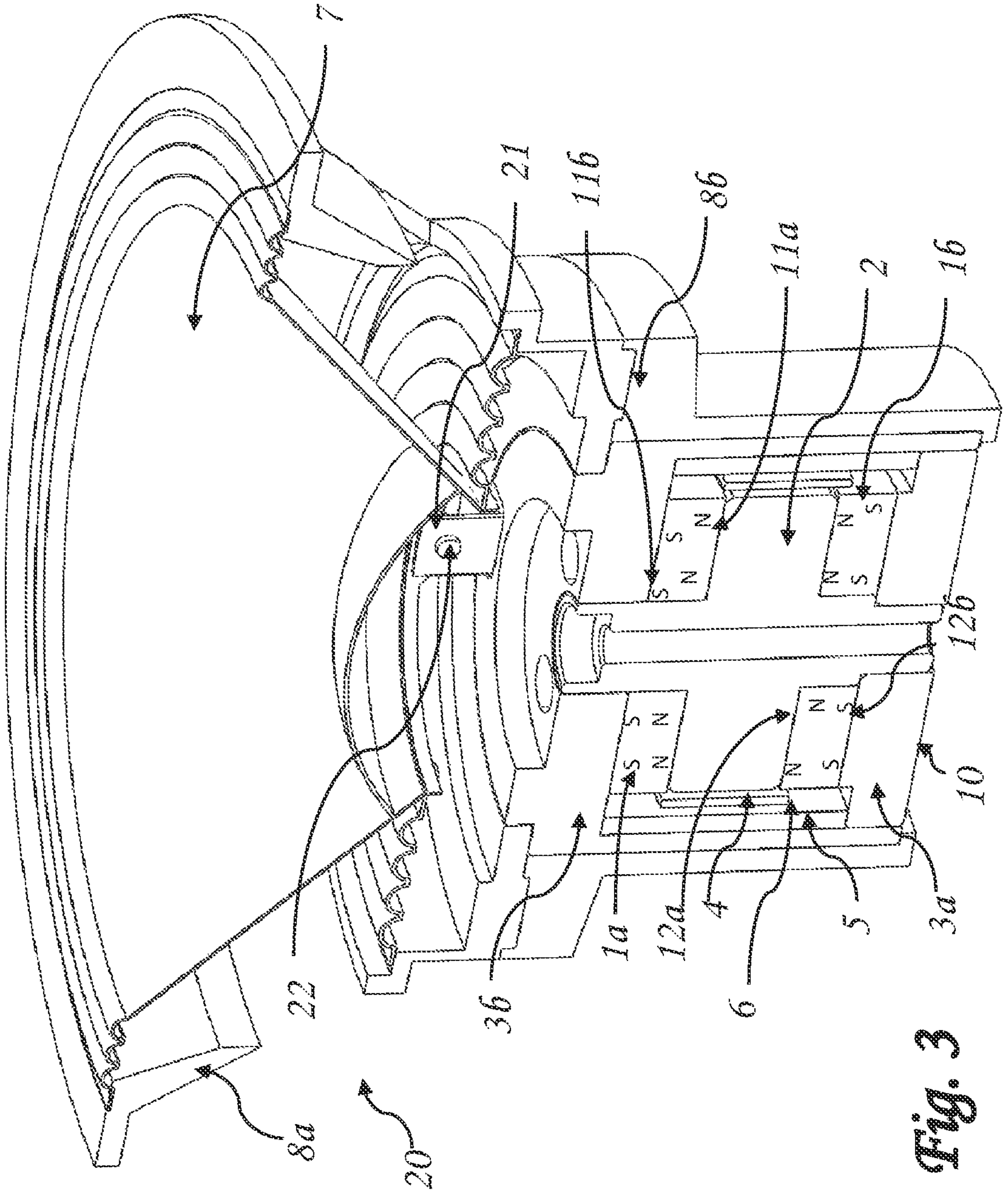
FIG. 3 shows a cross-sectional perspective view of the loudspeaker comprising the motor with the dual axial magnetic induction system according to one embodiment of the invention.
Figure 4:
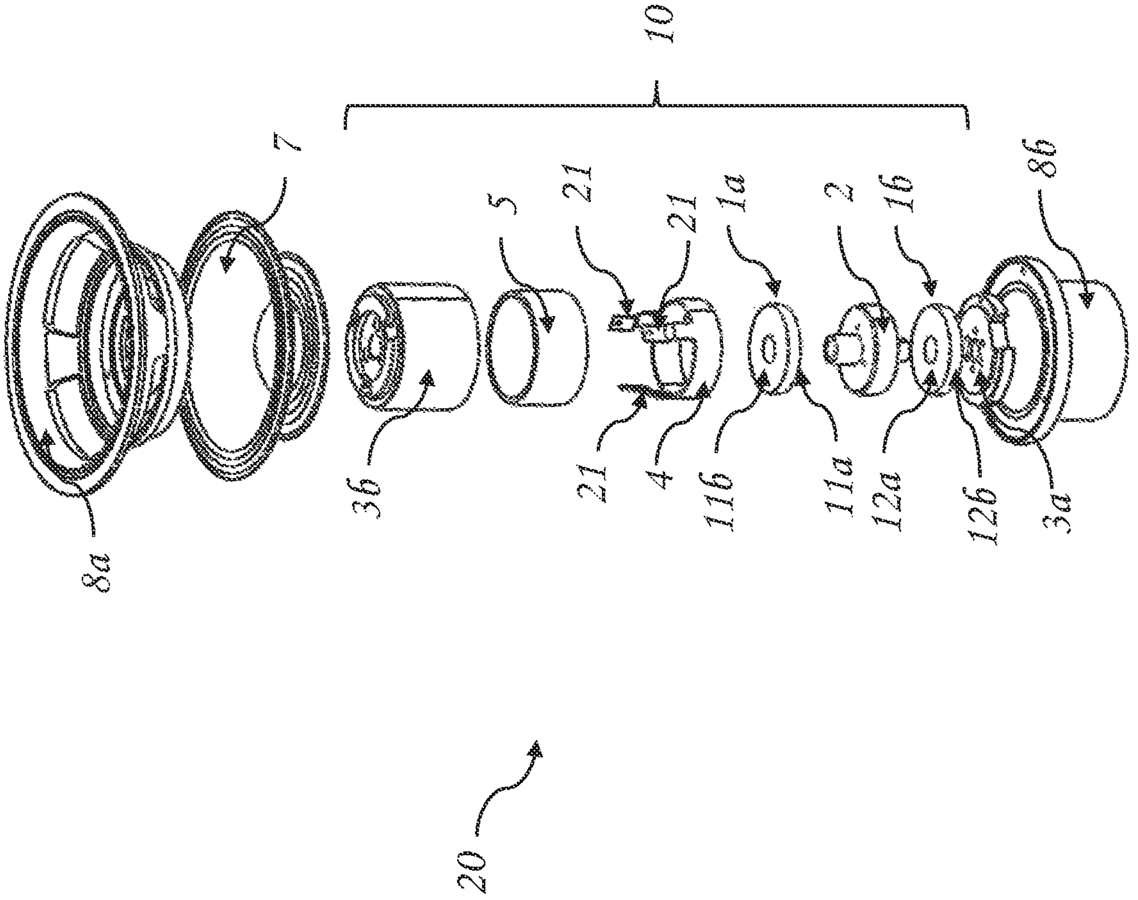
FIG. 4 shows an exploded view of the loudspeaker, showing all of the components of the motor and of the loudspeaker according to one embodiment of the invention.

The assembly of said loudspeaker 20 illustrated in FIG. 2 comprises said induction motor 10, said diaphragm 7 fixed to the salad bowl 8*a*, and a loudspeaker housing 8*b* used to fix said motor 10 with said salad bowl 8*a*.

Said magnets 1*a* and 1*b* may also be installed in an opposing manner, with respectively said south faces 11*b* and 12*b* in contact with said core 2, without the principle of operation of said induction motor 10 being altered, in an equivalent construction.

Said ring magnets 1*a* and 1*b* may be replaced by magnets taking the form of ring sections 1*c* and 1*d* or in the form of a disk 1*e* and 1*f* such as illustrated in the present application.

Figure 5:
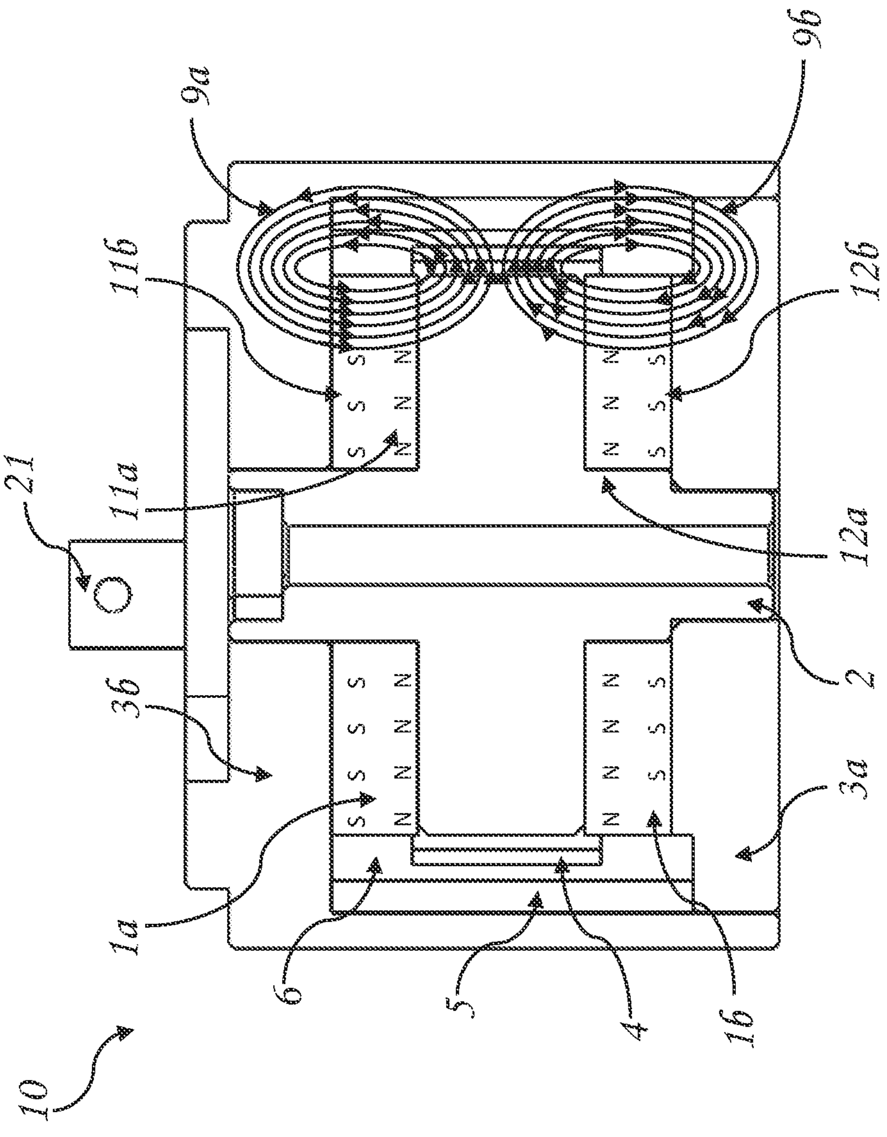
FIG. 5 shows a cross-sectional view of the motor with a dual axial magnetic induction system, and a representation of the magnetic fields modeled by arrows according to one embodiment of the invention.

With reference to FIG. 5, said upper magnets 1*a* and lower magnets 1*b* are positioned such that their poles in contact with said core 2 are the same. Said upper and lower magnets 1*a* and 1*b* create two distinct magnetic fields: an upper magnetic field 9*a* and a lower magnetic field 9*b*. Said upper magnetic field 9*a*, generated by said upper magnet 1*a*, firstly passes through said core 2, then said magnetic air space 6 from the inside to the outside and then interacts with said armature 4. It subsequently returns to said south face 11*b* of said upper magnet 1*a* through said fixed coil 5 and said bowl 3*b*. Said lower magnetic field 9*b*, generated by said lower magnet 1*b*, firstly passes through said core 2, then said magnetic air space 6, from the inside to the outside. It also interacts with said armature 4 then returns to said south face 12*b* of said lower magnet 1*b* via said fixed coil 5, said bowl 3*b* and said base plate 3*a*. Thus, within said magnetic air space 6, and notably in said armature 4, said magnetic fields 9*a* and 9*b* have the same direction and the same sense, which represents double the magnetic intensity with respect to a conventional induction system with a single radial magnetic flux.

Said magnetic fields 9*a* and 9*b*, coupled to the electric field generated by said fixed coil 5, create a force in said armature 4. This force drives the movement of said armature 4, linked to said diaphragm 7 for example by the means 21, 22 described hereinabove.

Thus, by increasing the intensity of the magnetic field experienced by said armature 4, the force applied to said armature 4 is increased and hence the performance characteristics of said loudspeaker 20 are enhanced.

The embodiments are described by way of illustrative examples and must not be considered as limiting. Other embodiments may call upon means equivalent to those described for example. The embodiments may also be combined together depending on the circumstances, or means used in one embodiment may be used in another embodiment.

The invention claimed is:

1. An induction motor device comprising:

a fixed coil;

a mobile armature within a magnetic space;

a central core; and at least two permanent magnetic sources disposed axially on either side of the central core, wherein poles of each of the permanent magnetic sources are axially aligned with the central core, and polarities of each of the permanent magnetic sources are opposing, thereby creating two distinct magnetic fields having (i) a same amplitude that is a same sense, and (ii) a same direction, in the magnetic space, representing double the magnetic intensity with respect to an induction system with a single radial magnetic flux, and a mobility of the mobile armature is provided by electromagnetic induction.

2. The induction motor device as claimed in claim 1, wherein at least one of the magnetic sources comprises one or more bipolar permanent ring magnets.

3. The induction motor device as claimed in claim 1, wherein at least one of the magnetic sources comprises one or more disk-shaped bipolar permanent magnets.

4. The induction motor device as claimed in claim 1, wherein at least one of the magnetic sources comprises one or more bipolar permanent magnets taking the form of ring sections.

5. A loudspeaker comprising at least one device as claimed in claim 1.

6. The loudspeaker as claimed in claim 1, further comprising at least one diaphragm linked to the armature and caused to move by the armature.

7. The loudspeaker as claimed in claim 5, further comprising a salad bowl to which the diaphragm is fixed and a housing fixing the induction motor device to the salad bowl.

* * * * *